UNITED STATES PATENT OFFICE.

HANS KUŽEL, OF BADEN, NEAR VIENNA, AUSTRIA-HUNGARY, ASSIGNOR TO GENERAL ELECTRIC COMPANY, A CORPORATION OF NEW YORK.

PROCESS OF MANUFACTURING INCANDESCENCE BODIES.

1,037,268.

Specification of Letters Patent. Patented Sept. 3, 1912.

No Drawing. Application filed April 10, 1906. Serial No. 311,014.

*To all whom it may concern:*

Be it known that I, HANS KUŽEL, a subject of the Emperor of Germany, residing at Baden, near Vienna, in the Empire of Austria-Hungary, have invented a certain new and useful Process of Manufacturing Incandescence Bodies, of which the following is a specification.

My invention relates to a process for manufacturing incandescence bodies or filaments for incandescent electric lamps of difficultly fusible elements with the use of colloidal oxids and hydroxids of difficultly fusible metals.

According to my present invention I intimately mix with oxids or hydroxids in a colloidal state of difficultly fusible metals, such as chromium, manganese, molybdenum, uranium, tungsten, vanadium, tantalium, niobium, titanium, zirconium, platinum, osmium, and iridium, elements other than carbon and melting at very high temperatures, such as the above named metals, boron or silicon, either in a colloidal state or in the form of very fine powders or in the form of mixtures of colloids and fine powders of the said elements. Then I withdraw, if necessary, from the resulting mixture so much of the inhibition liquid or liquids of the colloids used, by any known or preferred manner, that I obtain a plastic mass of suitable pasty consistency. I then bring this plastic mass into the desired shape, for instance in the shape of fine threads in any known or preferred manner. The bodies thus obtained are then cautiously dried and finally slowly heated to a white heat in a reducing atmosphere, free from carbon, preferably in hydrogen. By thus heating the body, the elements contained therein in the colloidal state are reconverted into the ordinary or crystalline state and at the same time the oxids or hydroxids contained in the bodies are reduced to metal in the ordinary or crystalline state, whereby an incandescence body or filament of the said elements in the ordinary or crystalline state and ready for use is obtained, which is homogeneous, compact and elastic.

It has been found that many of the colloidal oxids or hydroxids of the said metals possess a higher agglomerating power than the colloidal metals themselves and that therefore the plastic masses obtained with the use of the said colloidal oxids or hydroxids have a higher degree of plasticity and the bodies made of such plastic masses have a greater mechanical strength before and after drying than in the case where only colloids of metals are used.

I shall now describe by way of example one method of carrying into practice the above described process: 5 to 20 parts by weight of brown dioxid of tungsten are brought into the colloidal state in any known manner, for instance by etching with a diluted solution of potassium cyanid and then precipitated by electrolytes. The precipitate is intimately mixed with 95 to 80 parts by weight of an intimate plastic mixture of one or more refractory elements other than carbon in a colloidal state and one or more of such elements in a finely powdered solid state. Or I intimately mix 10 to 20 parts by weight of the above precipitate with 90 to 80 parts by weight of one or more of the above mentioned finely powdered refractory elements other than carbon. In both cases I obtain a plastic mass which may be treated as above set forth for producing incandescence bodies or filaments for electric glow lamps.

By "metals melting at very high temperatures," I mean metals which melt at a higher temperature than iron. I do not claim in this case broadly the colloidal process of making incandescent lamp filaments, as that forms a subject of my application Serial No. 239,637.

I wish it to be understood that the term "refractory element" used in the claim does not exclude the use of mixed elements (other than carbon) melting at very high temperatures, whether they are in a colloidal state or in the form of a powder or in the form of a mixture of such colloids and powders.

I claim as my invention—

The process of making metallic filaments which consists first in producing a plastic mass by mixing finely divided refractory material with a colloidal oxygen compound of metal melting at a very high temperature, then bringing such mass into filamentary shape, and then reducing said compound to metal and consolidating the body into a coherent filament by heating to a white heat in a suitable reducing atmosphere.

In testimony whereof I have signed my name to this specification, in the presence of two subscribing witnesses.

HANS KUŽEL.

Witnesses:
JOHN GEORGE HARDY,
ALVESTO S. HOGUE.